United States Patent
Leonard

(10) Patent No.: US 7,328,887 B2
(45) Date of Patent: Feb. 12, 2008

(54) SELF-INDEXING SPACER FOR AIR SPRING ASSEMBLY

(75) Inventor: Joshua R. Leonard, Noblesville, IN (US)

(73) Assignee: BFS Diversified Products, LLC, Indianapolis, IN (US)

(*) Notice: Subject to any disclaimer, the term of this patent is extended or adjusted under 35 U.S.C. 154(b) by 253 days.

(21) Appl. No.: 11/096,752

(22) Filed: Apr. 1, 2005

(65) Prior Publication Data

US 2006/0220283 A1    Oct. 5, 2006

(51) Int. Cl.
*F16F 5/00* (2006.01)
*B60G 9/04* (2006.01)

(52) U.S. Cl. ............... 267/122; 267/64.27; 267/35; 280/124.157

(58) Field of Classification Search ............ 267/35, 267/64.11, 64.23, 64.28, 122, 66, 64.27; 280/124.157

See application file for complete search history.

(56) References Cited

U.S. PATENT DOCUMENTS

| | | | |
|---|---|---|---|
| 4,502,736 A * | 3/1985 | Johnson | 305/9 |
| 4,568,067 A | 2/1986 | Iwata | |
| 5,586,830 A | 12/1996 | Wanek et al. | |
| 5,897,277 A | 4/1999 | Barre et al. | |
| 6,250,613 B1 | 6/2001 | Koeske et al. | |
| 6,659,702 B2 | 12/2003 | Kitayama et al. | |
| 6,945,548 B2 * | 9/2005 | Dudding et al. | 267/122 |
| 2004/0056446 A1 | 3/2004 | Dudding et al. | |

FOREIGN PATENT DOCUMENTS

| | | |
|---|---|---|
| DE | 42 13676 A1 | 10/1993 |
| DE | 19616476 A1 * | 11/1997 |
| EP | 1 300 264 | 4/2003 |

* cited by examiner

*Primary Examiner*—Thomas Williams
(74) *Attorney, Agent, or Firm*—Matthew P. Dugan; Thomas R. Kingsbury

(57) ABSTRACT

An air spring spacer for use in mounting an associated air spring in spaced relation to an associated vehicle component. The air spring spacer includes a spacer body, a first indexing feature, and a second indexing feature complementary to the first indexing feature. The indexing features providing for self-alignment of the spacer in a predetermined orientation upon the application of an axial force. A kit is also described.

30 Claims, 10 Drawing Sheets

SELF-INDEXING SPACER FOR AIR SPRING ASSEMBLY

BACKGROUND

The present novel concept broadly relates to the art of fluid suspension members and, more particularly, to a spacer having a self-indexing feature for use in forming a self-aligning air spring assembly.

The subject self-indexing spacer finds particular application in association with the use of air springs in forming a suspension system of a vehicle and will be discussed herein with particular reference thereto. However, it is to be specifically understood that the subject novel concept is capable of broad use and, as such, is equally applicable for use in other suitable environments, such as machinery mount applications, for example. Additionally, it will likewise be understood that the subject self-indexing spacer is also suitable for use in association with fluid suspension members of various types and kinds, in addition to those specifically discussed herein, without departing from the principles of the present novel concept.

Air springs and other such fluid suspension members are well known and commonly used in a broad range of applications. It is well understood that such applications have or establish design criteria, such as load capacity, spring rate, range of motion and/or size constraints, to which a properly selected and/or designed air spring will conform. Of course, an air spring having a diameter or other maximum cross-sectional dimension that is greater than that permitted by an established mounting envelope or other size limitation would likely be judged to be unsuitable for use in such an application. However, other situations arise in which an otherwise entirely suitable air spring will have a shorter nominal height than that called for by a particular application. Under these circumstances, it is often undesirable to use this otherwise suitable air spring in the application, as such use may undesirably limit a characteristic or function of the air spring, such as limiting travel, for example. Furthermore, over-extension of an air spring can, under most circumstances, be detrimental to one or more components thereof and, as such, is preferably avoided.

To overcome such concerns, spacers have been developed that make up the difference between the nominal height of the air spring and the design height specified in or otherwise established by the particular application or use. One example of such a spacer is disclosed in U.S. Pat. No. 6,250,613 (the '613 patent), which is incorporated herein by reference in its entirety. Basically, these spacers act to fill in the gap between an end member of the air spring and the associated vehicle component or other mounting surface.

One disadvantage of using such spacers, however, is that the difficulty associated with installing the air spring is increased. This is largely due to the added challenge of aligning the spacer with the various mounting holes of the air spring and the associated suspension component and maintaining this alignment during the installation process. Where such an alignment is not maintained, the fastening members will not engage the mounting holes until the components have been realigned. This can be particularly problematic where multiple spacers are used and are being stacked together to make up the difference between the air spring height and the design height of the vehicle suspension.

In other arrangements, the air spring will include a single fastener that projects from the end member or is received into the end member to mount the air spring. In these situations, the challenge of maintaining alignment of the spacers is reduced. However, another issue is raised in such situations which is related to the transmission of the associated vehicle loads through the one or more spacers. More specifically, spacers, such as those shown in the '613 patent, are capable of supporting the entire load on the associated air spring and transmitting the load to the associated suspension component. As shown in the '613 patent, however, such spacers can include a plurality of cored areas or other features that may be advantageous for manufacturing or other purposes. These cored areas are separated by a plurality of inner walls, often referred to as center tubes and/or ribs by those of skill in the art, that are formed inside the outer peripheral wall of the spacer.

Where the end member of an air spring is formed from a polymeric material, which is a common practice, similar cored areas and walls may be formed on the end member inwardly of the peripheral wall thereof. In such arrangements, it is desirable to have the inside walls of the end member and the inner walls of the spacer in substantial alignment with one another to transmit the associated loads through to the suspension component. Though more difficult to initially align, this is less of an issue where two or more fasteners are used because the fasteners will limit the rotation of the spacer relative to the end member. However, since many air springs are secured using a single fastening member that centrally extends from or engages the end member, it is more of a challenge to position the spacer and end member such that the inside walls thereof are properly aligned. Furthermore, the level of difficulty is again increased where multiple spacers are being used and secured between the end member and the vehicle suspension component with a single fastener.

BRIEF DESCRIPTION

An air spring spacer in accordance with the present novel concept is provided for use in mounting an associated air spring in spaced relation to an associated suspension component of an associated vehicle. One of the associated air spring and the associated suspension component includes an associated external structural feature. The air spring spacer includes a spacer body having a first side, an opposing second side, and a body structural feature. The air spring spacer also includes a first indexing feature disposed on the spacer body toward the first side thereof which has a first predetermined orientation relative to the body structural feature. The air spring spacer also includes a second indexing feature complementary to the first indexing feature. The second indexing feature is disposed on the spacer body toward the second side thereof and in a second predetermined orientation relative to the body structural feature. The second predetermined orientation being substantially similar to the first predetermined orientation of the first indexing feature.

An air spring assembly in accordance with the present novel concept is provided and is adapted for use on an associated vehicle component of an associated vehicle. The air spring assembly includes an air spring and a spacer suitable for supporting the air spring in spaced relation to the associated vehicle component. The air spring includes a first end member having a spring structural feature, a second end member in spaced relation to the first end member and a flexible wall secured between the first and second end members. The spacer includes a first side, an opposing second side, a first indexing feature and second indexing feature complementary to said first indexing feature. The first indexing feature is disposed on the spacer toward the first side and in a first predetermined orientation relative to the spacer structural feature. The second indexing feature is disposed on the spacer toward the second side in a second predetermined orientation relative to the spacer structural feature. The first and second predetermined orientations are substantially similar such that the first and second indexing features are in substantial alignment with one another.

An air spring mounting kit in accordance with the present novel concept is provided for use in mounting an air spring on an associated suspension component of an associated vehicle and in selectively spaced relation thereto. The air spring mounting kit includes a first spacer and a second spacer. The first spacer includes a first side, an opposing second side, a spacer structural feature, a first indexing feature formed toward the first side and a second indexing feature formed toward the second side. The first and second indexing features are complementary to one another and disposed in a predetermined orientation relative to the spacer structural feature. The second spacer includes a first side, an opposing second side, a spacer structural feature, a first indexing feature formed toward the first side and a second indexing feature formed toward the second side. The first and second indexing features are complementary to one another and are disposed in a predetermined orientation relative to the spacer structural feature. At least one of the first and second indexing features of the first spacer and at least one of the first and second features of the second spacer are adapted to interengage one another forming a common axis therebetween. Upon undergoing an axially applied external force the first and second spacer automatically register the spacer structural feature of the first spacer and the spacer structural of the second spacer in substantial alignment with one another.

DETAILED DESCRIPTION

Figure 1:
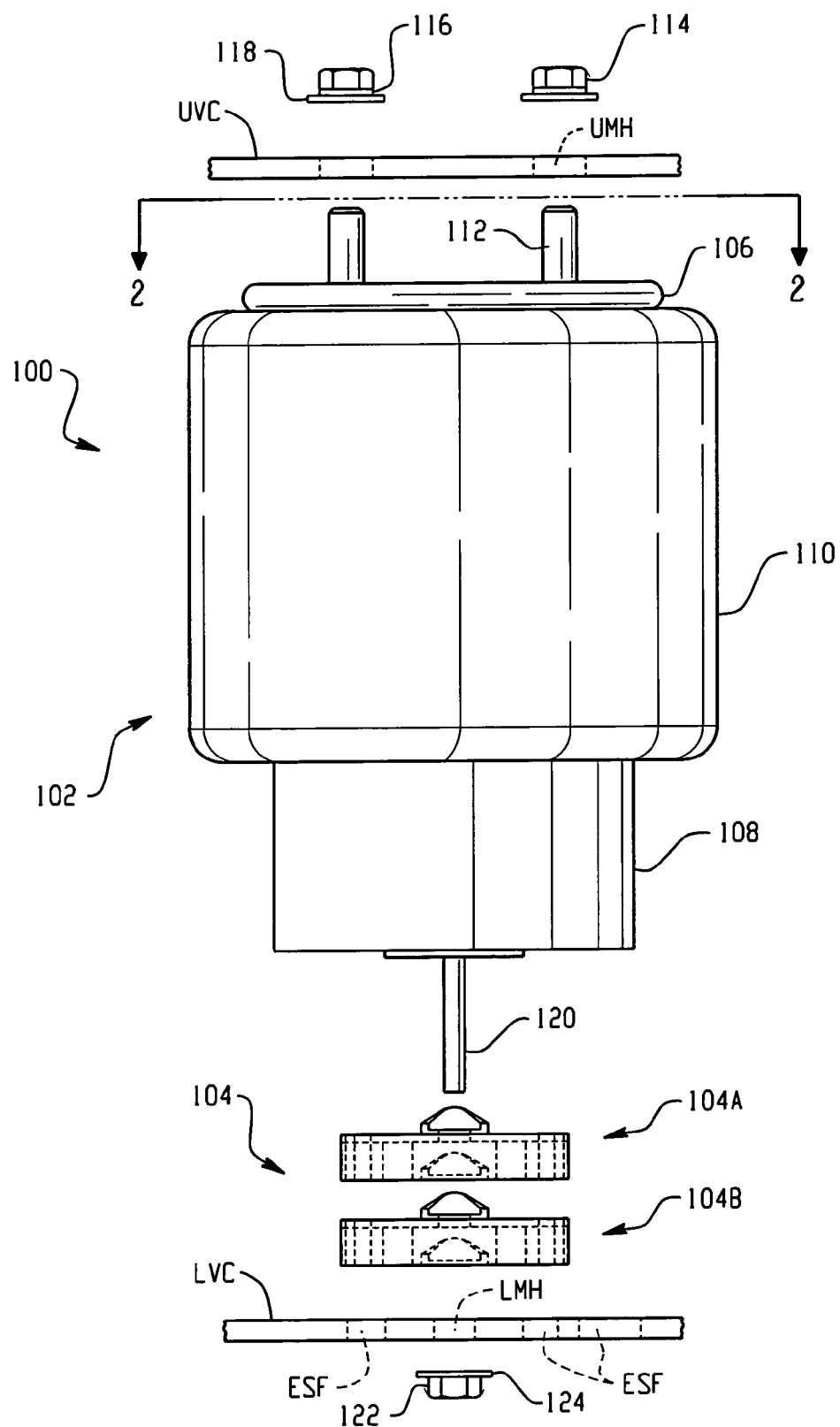
FIG. 1 is an exploded side view of one embodiment of an air spring and spacer assembly in accordance with the present novel concept shown in use with associated vehicle components.
Figure 2:
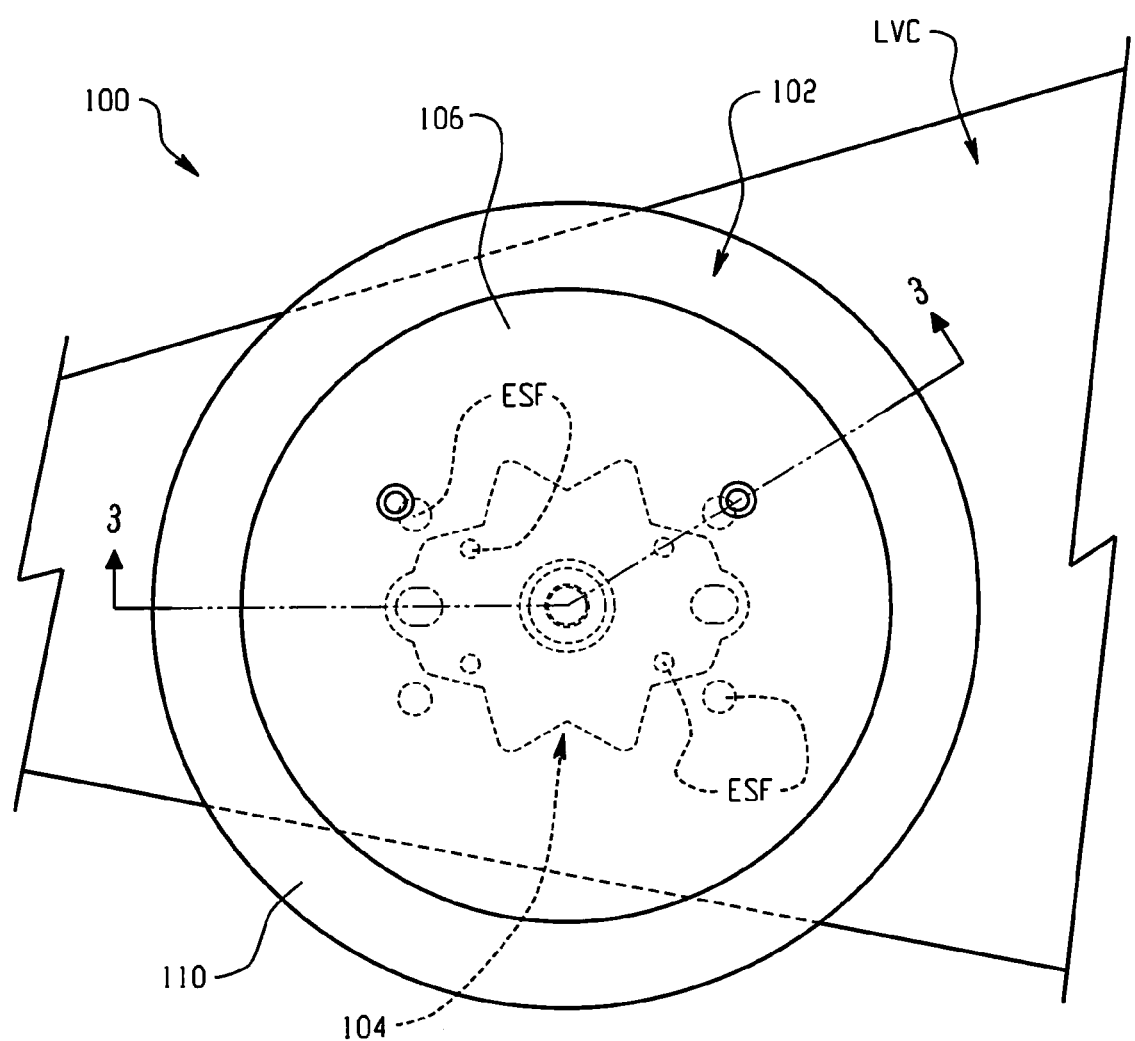
FIG. 2 is a top plan view of the air spring and spacer assembly and the associated lower vehicle component in FIG. 1 taken from line 2-2.

Turning now to the drawings, wherein the showings are for the purposes of illustrating exemplary embodiments of the present novel concept only and not for the purposes of limiting the same, FIG. 1 illustrates an air spring and spacer assembly 100 that includes an air spring 102 and a plurality of spacers 104 disposed adjacent the air spring. It will be appreciated that air spring and spacer assembly 100 is suitable for use in a wide variety of applications and environments, including automotive and other vehicle applications as well as with machinery mounting and other industrial applications, for example. In one exemplary application, shown in FIGS. 1-3, air spring and spacer assembly 100 is secured on a vehicle (not shown) between an upper vehicle component UVC, such as a vehicle structural members, for example, and a lower vehicle component LVC, such as a vehicle suspension member, for example. It will be appreciated, however, that any suitable mounting arrangement and/or components can alternately be used and that the use of any such components will vary from application to application.

Air spring 102 includes an upper end member or bead plate 106 and a lower end member or piston 108. A flexible wall or sleeve 110 is secured between the bead plate and piston forming a rolling lobe-type air spring. It will be appreciated, however, that the present novel concept is equally applicable with air springs of any other suitable type and/or kind, such as convoluted air springs, for example. Those of skill in the art will recognize that convoluted air springs have opposing bead plates but do not include a piston. Additionally, it is to be understood that a wide variety of mounting arrangements are known and commonly used, that the air spring mounting arrangements shown and described herein are merely exemplary, and that the present novel concept can be used in association with any other suitable mounting arrangement without departing from the principles thereof.

Bead plate 106 of air spring 102 is positioned adjacent upper vehicle component UVC such that upper mounting holes UMH of the upper vehicle component receive upper mounting studs 112 extending from bead plate 106. Once assembled, studs 112 extend through mounting holes UMH and are secured thereto using suitable securement devices, such as threaded nuts 114, for example. Optionally, flat-washers 116 and lock washers 118 can be used in conjunction with threaded nuts 114.

Piston 108 is disposed toward lower vehicle component LVC with a first spacer 104A disposed therebetween. Optionally, a second spacer 104B can also be included to position piston 108 a further distance from lower vehicle component LVC. As such, it is to be distinctly understood that the present novel concept includes the use of a first spacer operatively associated with the air spring, and that any suitable number of additional spacers can optionally be used.

Figure 3:
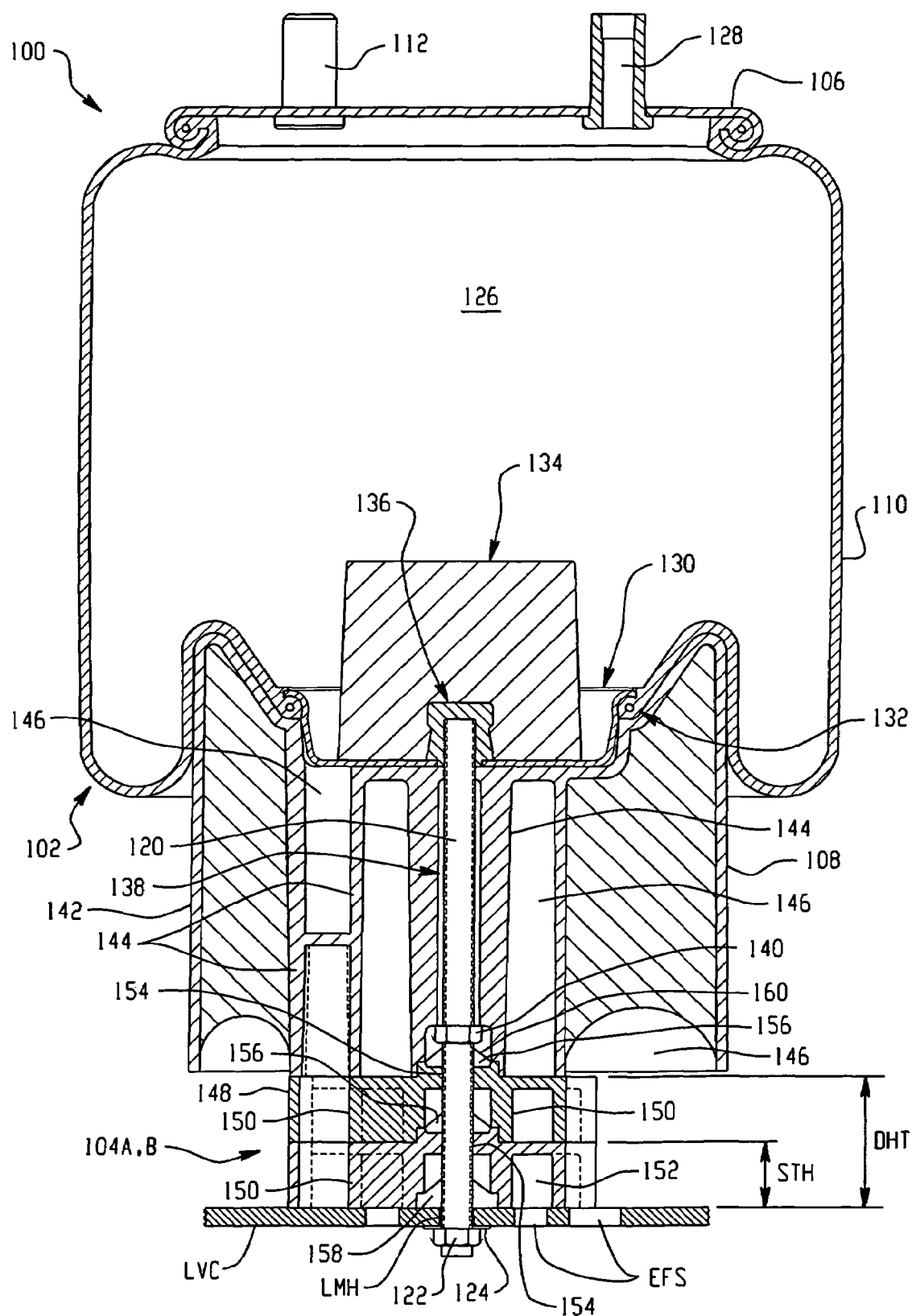
FIG. 3 is a side view, in cross section, of the air spring and spacer assembly and the associated lower vehicle component in FIGS. 1 and 2 taken along line 3-3 in FIG. 2.
Figure 4:
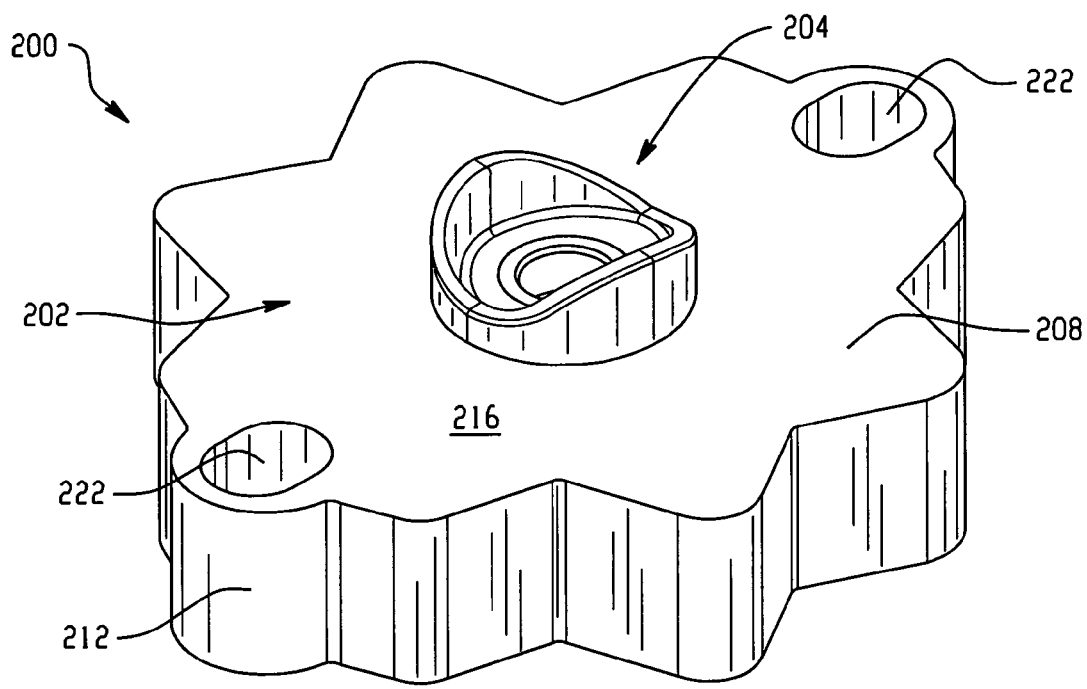
FIG. 4 is a top perspective view of one embodiment of a spacer in accordance with the present novel concept.
Figure 5:
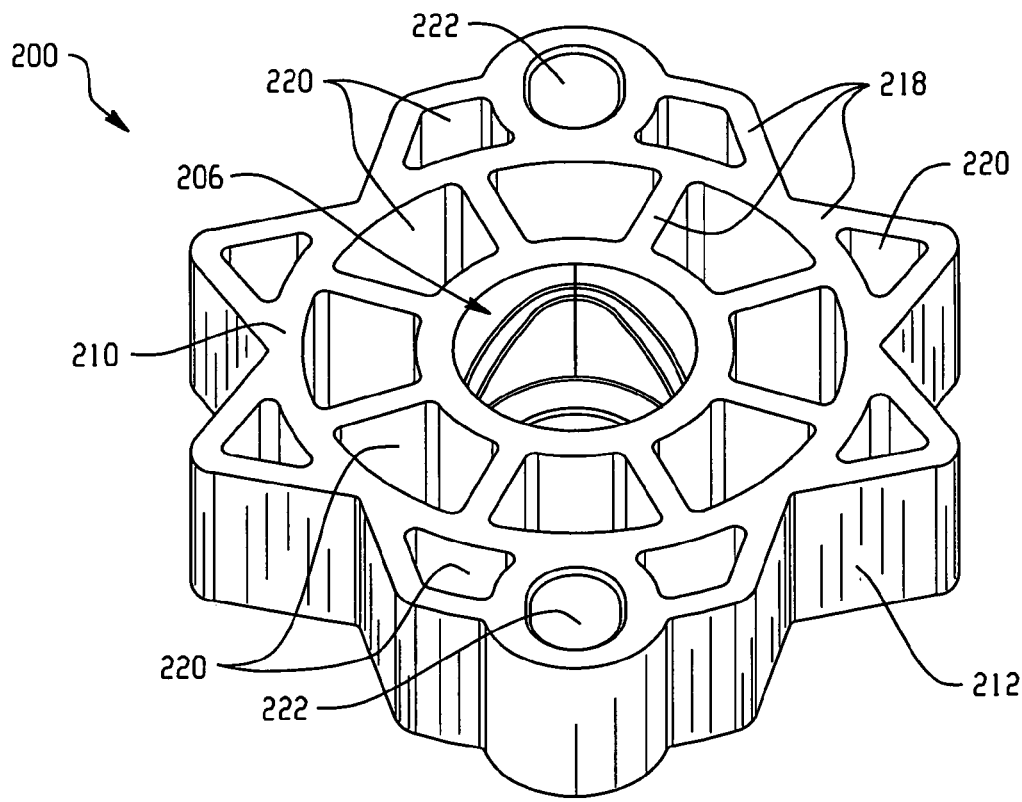
FIG. 5 is a bottom perspective view of the spacer in FIG. 4.
Figure 6:
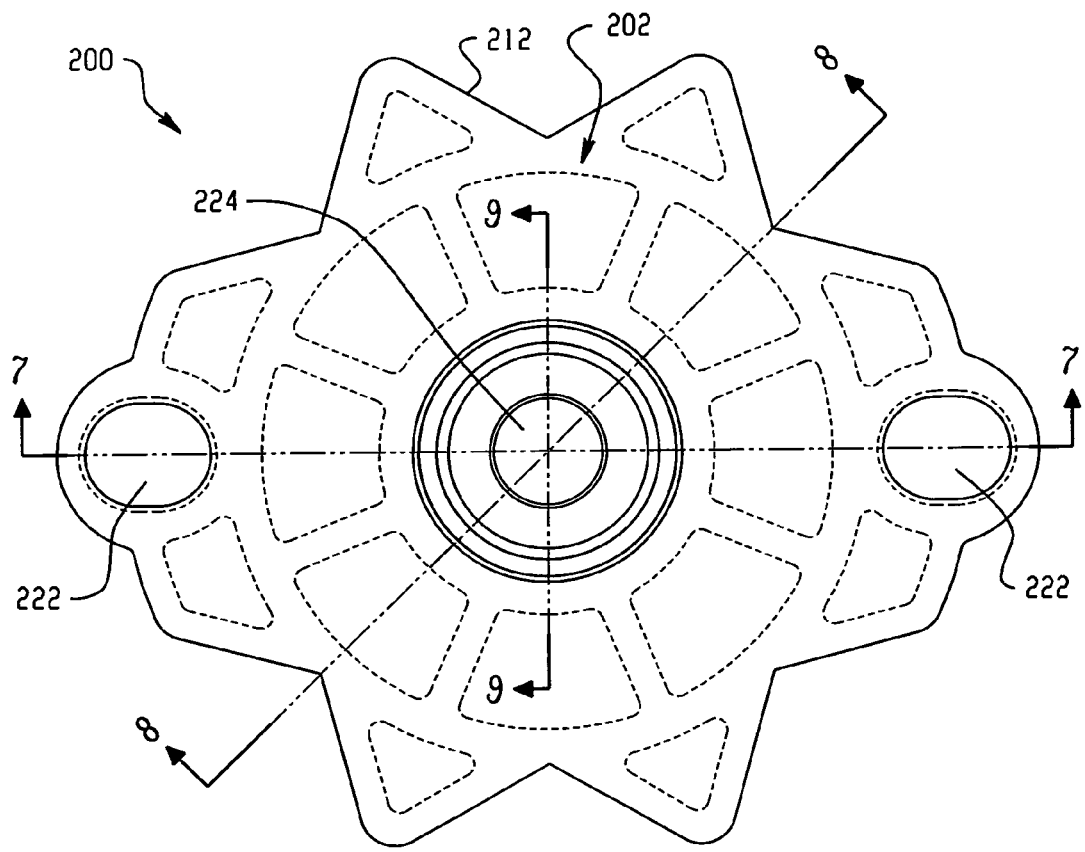
FIG. 6 is a top plan view of the spacer in FIGS. 4 and 5.

Lower vehicle component LVC includes a lower mounting hole LMH extending therethrough along with additional external structural features. Such additional external structural features are shown as holes or openings ESF in FIGS. 1-3. However, it is to be understood that these are merely exemplary for the purposes of describing the present novel concept, and that it may be desirable to align the subject spacers with any suitable external structural feature or features. Lower mounting hole LMH is suitable for receiving a fastener, such as lower mounting stud 120, for example. In an assembled condition, one or more spacers 104, two of which are shown in FIGS. 1 and 3, are captured between lower vehicle component LVC and piston 108 of air spring 102. Mounting stud 120 extends through a corresponding passage (not numbered) in the spacer or spacers and through lower mounting hole LMH of the lower vehicle component. A suitable securement device, such as a threaded nut 122, for example, engages stud 120 and thereby secures the piston and spacer or spacers to the lower vehicle component. Additionally, a flat washer 124 and/or a lock washer (not shown) can optionally be used in operative association with nut 124.

Air spring and spacer assembly 100 is shown in an assembled condition on lower vehicle component LVC in FIG. 3. As such, any difference between the nominal height of the air spring and the design distance between the upper and lower vehicle components can be filled by using one or more spacers of a suitable height, as indicated by differential height dimension DHT. Thus, it will be appreciated that the gap or differential height can be filled by using a single spacer having a thickness substantially equal to dimension DHT. Alternately, a plurality (n) of spacers, each having a thickness $STH_n$ approximately equivalent to the differential height divided by the number of spacers being used ($STH_n$=DHT/n), for example, can be used and stacked together to fill the gap or differential height DHT. Of course, multiple spacers having a variety of thicknesses could also be used, so long as the total height or thickness of the stack of spacers is approximately equal to the gap or differential height that is being filled.

As mentioned above, it is desirable to have an air spring, such as air spring 102, for example, mounted on spacers that are in substantial alignment with one another, where two or more spacers are being used. Additionally, it is also often desirable for the one or more spacers to be positioned or registered relative to certain adjacent, obstructive or other structural features external to the spacer, such as holes ESF of lower vehicle component LVC. Additionally, or in the alternative, it may be desirable to position or register the spacers relative to adjacent, obstructive or other structural features of the air spring. One exemplary embodiment of such an arrangement is shown in FIG. 3, which illustrates air spring 102 in additional detail.

Bead plate 106 and piston 108 of air spring 102 are spaced from one another, and sleeve 110 is secured therebetween at least partially defining a spring chamber 126. A fluid passage 128 is formed in at least one of upper mounting studs 112 providing fluid communication with spring chamber 126. Sleeve 110 can be secured on bead plate 106 in any suitable manner, such as by forming a crimp around the top edge thereof, for example. Likewise, the bottom edge of sleeve 110 can be secured on piston 108 in any suitable manner. As shown in FIG. 3, the bottom edge of sleeve 110 is captured between an end closure or dish 130 and an end wall 132 of piston 108. Dish 130 is secured on piston 108 using lower mounting stud 120. A bumper 134 is secured within spring chamber 126 along dish 130 by a threaded insert 136. The threaded insert is secured to mounting stud 120 and engages at least a portion of dish 130. Piston 108 includes a mounting passage 138 extending therethrough that is dimensioned to receive mounting stud 120 which extends therethrough and projects outwardly from the bottom of the piston. An assembly nut 140 engages a suitable shoulder or surface (not numbered) of piston 108 along mounting passage 138 and threadably engages mounting study 120 thereby securing the bumper, dish and sleeve to piston 108 along end wall 132 thereof.

The piston includes an outer wall 142 extending from end wall 132, and also includes additional piston structural features formed into and along the piston. In the exemplary embodiment shown in FIG. 3, the piston structural features include a plurality of inner walls 144 and associated cored areas or spaces 146. However, it is to be understood that any desired feature of the piston or end member can be used as a piston structural feature.

Spacers 104A and 104B are substantially identical and include an outer peripheral wall 148 and a plurality of inner walls 150 that form cored areas or spaces 152. Additionally, a hole 154 is formed generally centrally through spacers 104 and lower mounting stud 120 extends through the holes and through lower mounting hole LMH of lower vehicle component LVC to receive nut 122 and washer 124 and thereby secure assembly 100 on the lower vehicle component.

As mentioned above, it is often desirable to index or otherwise register a spacer relative to one or more other features, such as the walls of another spacer, the piston structural features and/or the external structural features of a vehicle component, for example. As such, each of spacers 104 includes a first indexing feature 156 and a corresponding second indexing feature 158. Thus, the spacers can be aligned or otherwise registered relative to one another by interengaging the corresponding indexing features. Additionally, piston 108 can optionally include a piston indexing feature 160 that generally corresponds to one of indexing features 156 and 158 and is suitable for interengaging the same. In the exemplary embodiment shown in FIGS. 1-3, the indexing features are generally centrally formed around mounting stud 120. As such, the spacers will remain in position relative to one another without the use of multiple fasteners, as discussed above. Additionally, the one or more spacers can be maintained in substantial alignment with the piston external structural features while using only a single mounting stud rather than multiple fasteners. For example, inner walls 144 and core areas 146 of piston 108 are retained in respective alignment with inner walls 150 and cored areas 152 of the spacers, thus ensuring the desired transmission of loads from the air spring through to the lower vehicle component. Furthermore, by selectively mounting the air spring in a given orientation, the inner walls and cored areas of the piston and spacers can likewise be maintained in a desired position relative to other external structural features, such as holes ESF formed in the lower vehicle component, for example.

It will be appreciated that the structure and use of the air spring and spacers have been shown in and described with regard to the foregoing in general terms. Specific examples of suitable embodiments of spacers in accordance with the present novel concept are discussed in additional detail hereinafter. It will be appreciated that each of the following exemplary embodiments are suitable for use in the manner discussed above, and that these exemplary embodiments are not intended to be limited to the specific geometric patterns and/or configurations of indexing features shown. Rather, any suitable geometric pattern or groups of patterns can be used, either individually or in combination, without departing from the principles of the present novel concept. For example, any combination of male and female indexing features can be used. Furthermore, spacers of any suitable size, shape and/or configuration can be used, and different shapes, sizes, thicknesses and/or configurations of spacers can be used, alone or in combination with one another without departing from the principles of the present novel concept. However, it will be appreciated that where spacers of different shapes, sizes, thicknesses and/or configurations are used, it is preferable for the structural features thereof to be substantially aligned from spacer to spacer. That is, where multiple spacers are used it is desirable for the center tubes and ribs, along with other structural features thereof, to be aligned from one spacer to the next.

One exemplary embodiment of a spacer 200 in accordance with the present novel concept is shown in FIGS. 4-9, and generally includes a spacer body 202, a first indexing feature 204 and a corresponding second indexing feature 206. Spacer body 202 includes a first or top side 208 and an opposing second or bottom side 210. An outer peripheral wall 212 extends between the top and bottom sides of the spacer body. Spacer body 202 is shown herein as having a somewhat gear or star-shaped periphery. However, it is to be specifically understood that any suitable shape or configuration of a spacer body can be used.

Spacer body 202 includes a top wall 214 on top side 208 that generally forms a substantially planar, solid surface 216. A plurality of inner walls 218 extend from top wall 214 toward bottom side 210 and form a corresponding plurality of cored areas or voids 220, which are open ended along bottom side 210. Spacer body 202 also includes elongated holes or slots 222 that are suitable for receiving a fastener for securing the spacer and air spring on a structural component. Additionally, a central mounting passage 224 extends through spacer body 202, and the first and second indexing features are formed therealong. However, it will be appreciated that any suitable arrangement and/or configuration of indexing features can be used, such as including a plurality of first indexing portions in spaced relation to the central mounting passage and to one another and corresponding second indexing portions, for example.

First indexing feature 204 is disposed along spacer body 202 toward top side 208 and projects outwardly from top surface 216 of top wall 214. First indexing feature 204 includes a first feature side wall 226 forming the outer periphery of the first indexing feature. The first indexing feature extends from top wall 214 and terminates at a first feature end wall 228. A recess 230 extends into first indexing feature 204 from along end wall 228 and extends toward top wall 214.

Second indexing feature 206 is disposed on spacer body 202 toward bottom side 210 and extends therefrom into the spacer body. The second indexing feature includes a second feature side wall 232 that terminates at a second feature end wall 234. Additionally, a recess 236 extends into spacer body 202 from along the second indexing feature.

First indexing feature 204 and second indexing feature 206 include corresponding conformations or profiles formed along at least one of the respective side walls and the respective end walls thereof. These complementary conformations are formed by one or more occurrences or repetitions of a predetermined geometric pattern, which in spacer 200 is formed along the end wall of each indexing feature. However, it will be appreciated that other embodiments can include conformations formed along the side wall of the indexing feature in the alternative to, or in addition to, being formed along the end wall of the indexing features.

The conformation or profile of the indexing feature includes one or more occurrences or repetitions of a geometric pattern, and it will be appreciated that each occurrence of the pattern will correspond to a single indexing position. That is, where a single occurrence of the geometric pattern is provided on each of the spacers, the two corresponding spacers will have only one indexing position. Where the indexing features include two occurrences or repetitions of the geometric pattern on at least one spacer, the two corresponding spacers will have two indexing positions. Where there are three repetitions of the geometric pattern on the indexing features on at least one spacer, the spacers will have three corresponding indexing positions, and so on. As such, a suitable number of indexing positions can be provided depending upon the specifics of the application and/or environment. It will be appreciated, however, that where a greater number of repetitions or occurrences of the geometric pattern are provided on at least one of the indexing features than the desired number of indexing positions, then the opportunity will exist for the spacers to be indexed into a non-aligned position. Additionally, it is to be distinctly understood that any suitable geometric pattern or group of patterns can be used, individually or in combination, without departing from the principles of the present novel concept, including sawtooth shaped patterns, zigzag patterns, curvilinear patterns, stepped patterns, keyed patterns, and/or other interrupted patterns, for example.

In the exemplary embodiment of spacer 200 shown in FIGS. 4-9, indexing features 204 and 206 each include two occurrences or repetitions of a sinusoidal wave formed along end walls 228 and 234, respectively. Additionally, the sinusoidal wave pattern is oriented on each end wall such that the lower portions of the wall are disposed in substantial alignment with a center line extending between slots 222. As such, when two spacers are stacked together, the first indexing feature of one spacer will mate with or otherwise interengage the second indexing feature of the other spacer and the respective passages, inner walls and cored areas will be aligned and remain in alignment so long as the indexing features are interengaged. That is, during assembly the self-indexing features are used to automatically guide the spacer or spacers to an appropriate position when an axial force is applied thereto, such as from installing threaded nut 122 (FIGS. 1 and 3) on mounting stud 120 (FIGS. 1 and 3), for example.

Figure 7:
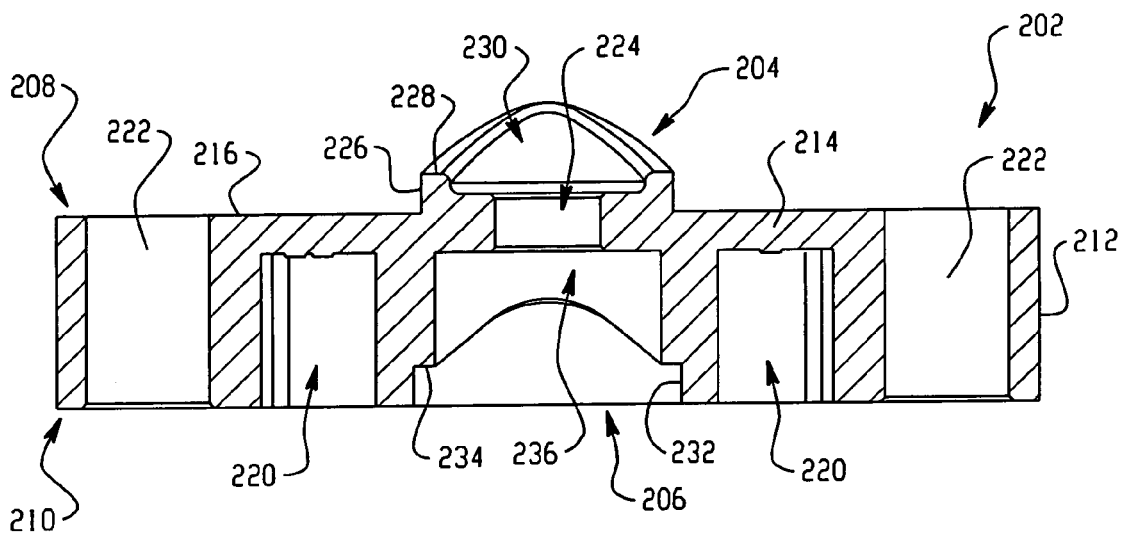
FIG. 7 is a cross-sectional side view of the spacer in FIGS. 4-6 taken along line 7-7 in FIG. 6.
Figure 7A:
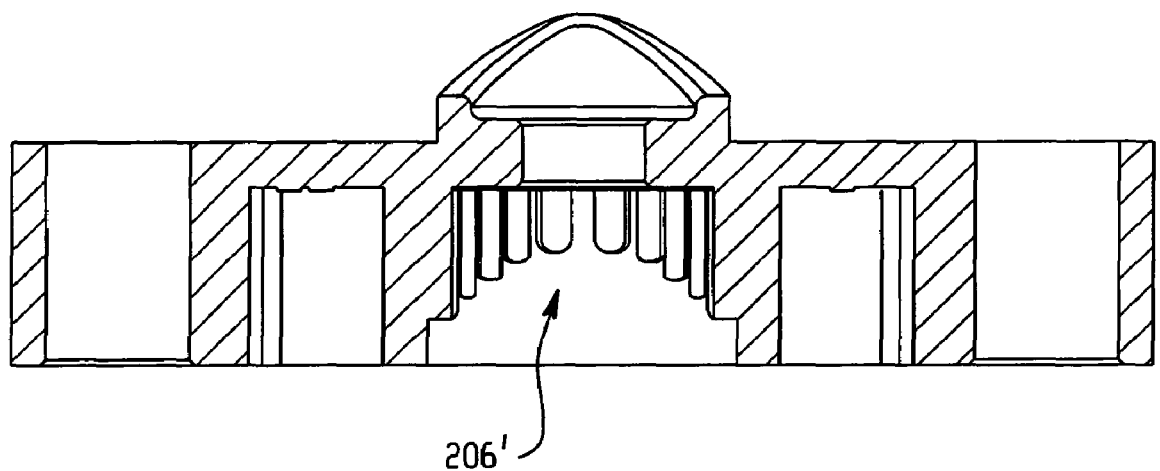
Figure 9A:
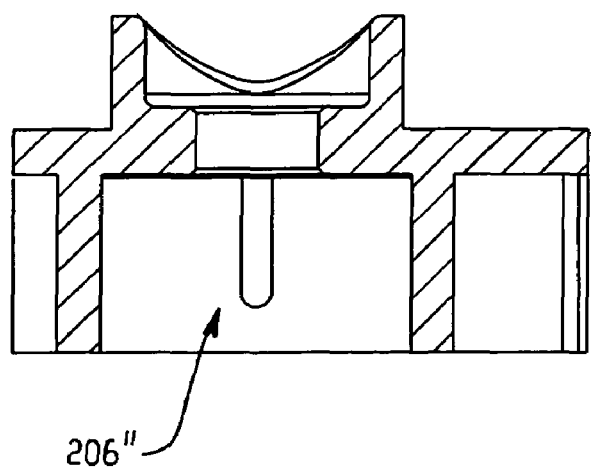
FIG. 9 is a cross-sectional side view of the spacer in FIGS. 4-6 taken along line 9-9 in FIG. 6.
Figure 8:
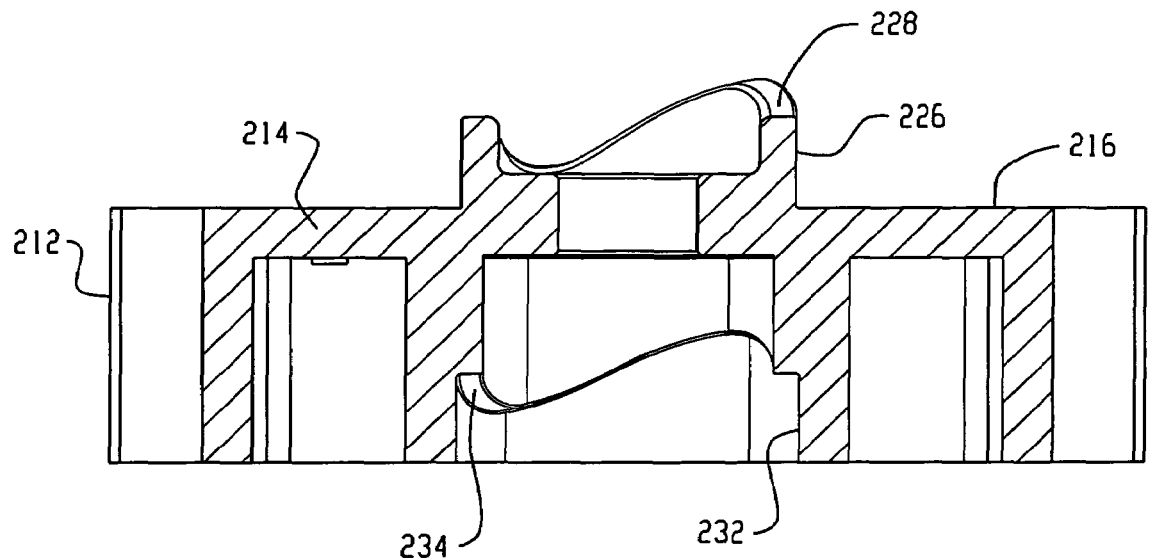
FIG. 8 is a cross-sectional side view of the spacer in FIGS. 4-6 taken along line 8-8 in FIG. 6.
Figure 9:
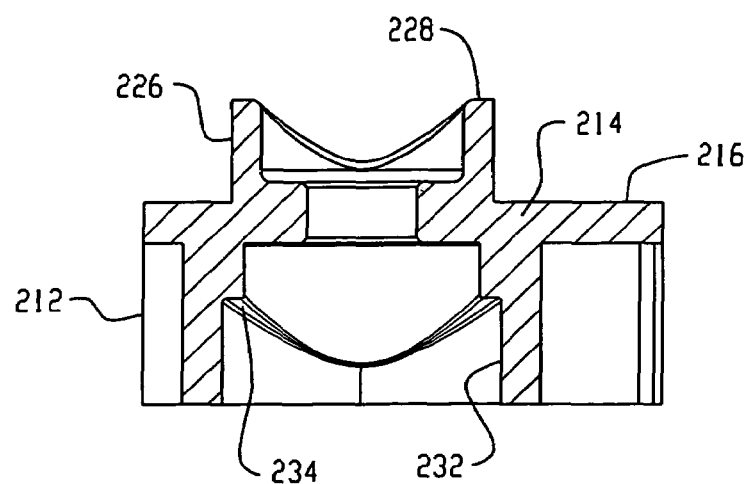

As such, it will be distinctly understood that any suitable feature or features can be used as indexing features, and that the indexing features can be continuously or discontinuously formed without departing from the scope and intent of the present novel concept. For example, an alternate embodiment of indexing feature 206 is shown in FIG. 7A as indexing feature 206' which includes a plurality of axially extending ribs having ends that together generally form the sinusoidal wave shown in FIG. 7. The ends of the ribs are shown as being rounded, but it will be appreciated that any suitable shape or configuration can be use. As such, when first indexing feature 204, or another suitable indexing feature, of an adjacent spacer is axially displaced toward indexing feature 206', the continuously formed end wall of first indexing feature 204 will engage the ribs of indexing feature 206' and be guided into the appropriately aligned position. As another example, another alternate embodiment of indexing feature 206 is shown in FIG. 9A as indexing feature 206" that includes a single axially extending rib, though it will be appreciated that additional ribs could also be included. The rounded end of the single rib of indexing feature 206" represents one of the two low points of the sinusoidal wave form in FIG. 9. Thus, as indexing feature 204, or another suitable indexing feature, is axially forced into indexing feature 206", the rounded end of the rib will engage the end wall of the incoming indexing feature and cause the two spacers (or other components) to rotate or otherwise move into an appropriate position.

Figure 10:
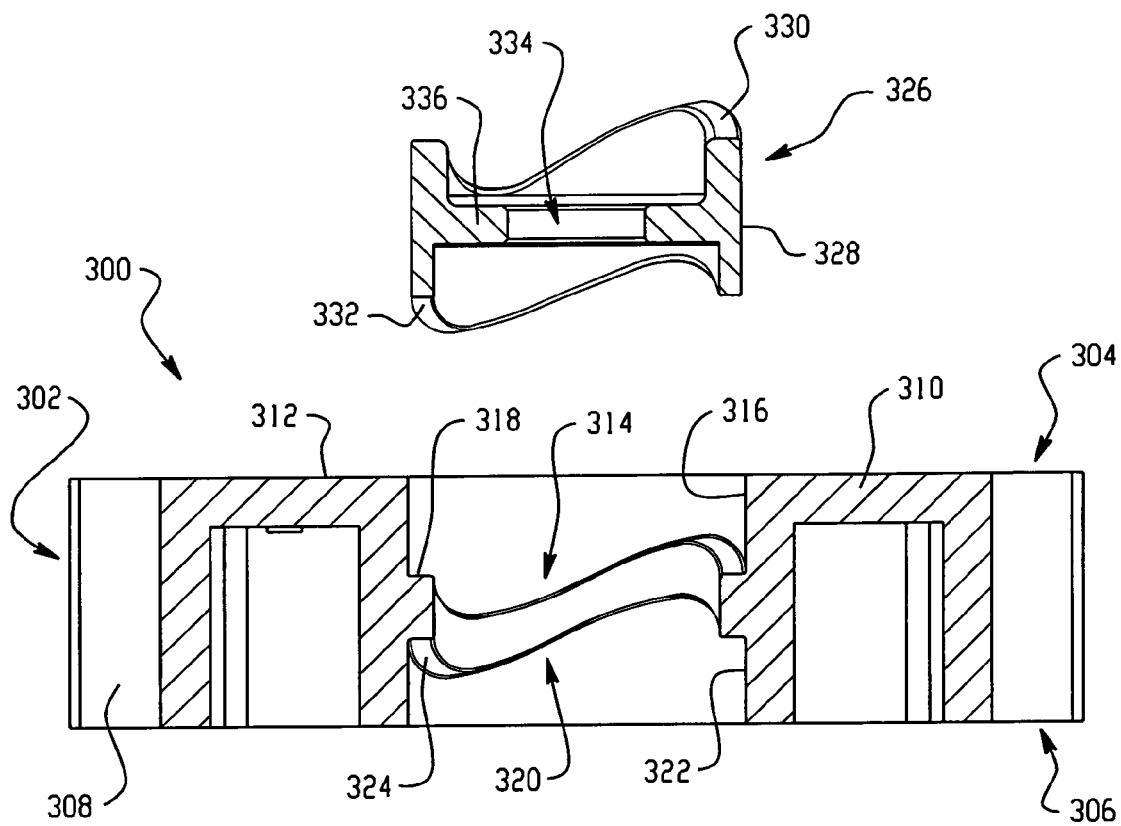
FIG. 10 is a cross-sectional side view of an alternate, two-piece construction of the spacer in FIGS. 4-9 shown in an unassembled condition.
Figure 11:
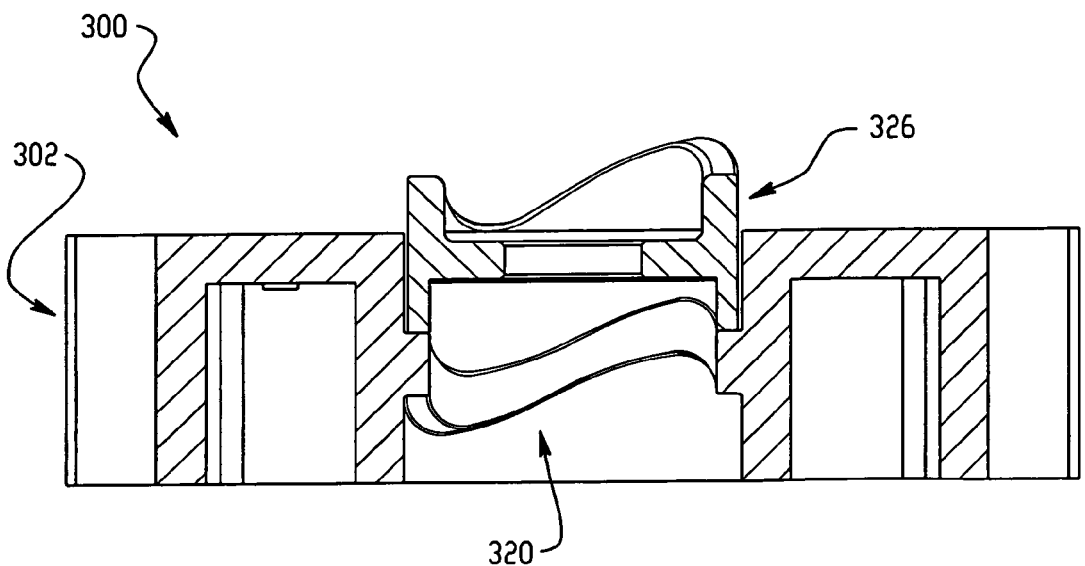
FIG. 11 is a cross-sectional side view of the spacer in FIG. 10 shown in an assembled condition.

An alternate construction of spacer 200 is shown in FIGS. 10 and 11 as spacer 300. Spacer 300 is substantially similar to spacer 200 shown in and discussed with regard to FIGS. 4-9. However, spacer 200 is shown as a unitary construction, whereas spacer 300 is a two-part construction. Spacer 300 includes a spacer body 302 having a first or top side 304 and an opposing, second or bottom side 306. An outer peripheral wall 308 extends between the top and bottom sides, and generally defines the outer shape of the spacer. A top wall 310 is formed along top side 304 and forms a substantially planar, solid top surface 312.

A first indexing feature 314 is disposed toward top side 304 and includes a side wall 316 extending into spacer body 302 and terminating at an end wall 318. A second indexing feature 320 is disposed toward bottom side 306 of spacer body 302 and also includes a side wall 322 extending into spacer body 302 terminating at an end wall 324.

A spacer sleeve 326 includes a substantially cylindrical outer wall 328 that is dimensioned to be received within either of indexing features 314 or 320. Additionally, spacer sleeve 326 includes opposing end walls 330 and 332 and a central passage 334 extending through a web portion 336 extending generally transverse outer wall 328.

End walls 318 and 324 of indexing features 314 and 320, respectively, include two repetitions of a sine wave pattern, such as that discussed above with regard to spacer 200. Additionally, end walls 330 and 332 of spacer sleeve 326 also include a substantially identical sine wave pattern such that the spacer sleeve can be received within either of the indexing features. In FIG. 11, spacer sleeve 326 is received within first indexing feature 314 and forms a spacer that is substantially similar to spacer 200 discussed above.

Figure 12:
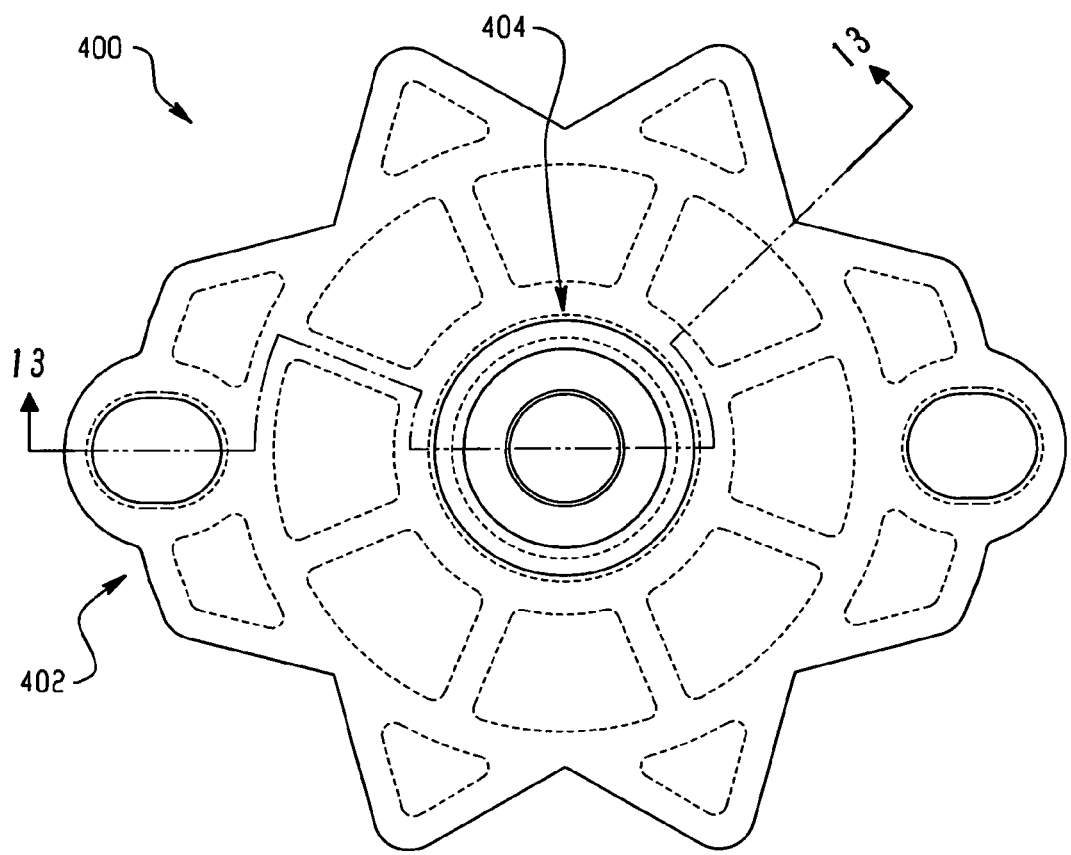
FIG. 12 is a top plan view of another embodiment of a spacer in accordance with the present novel concept.
Figure 13:
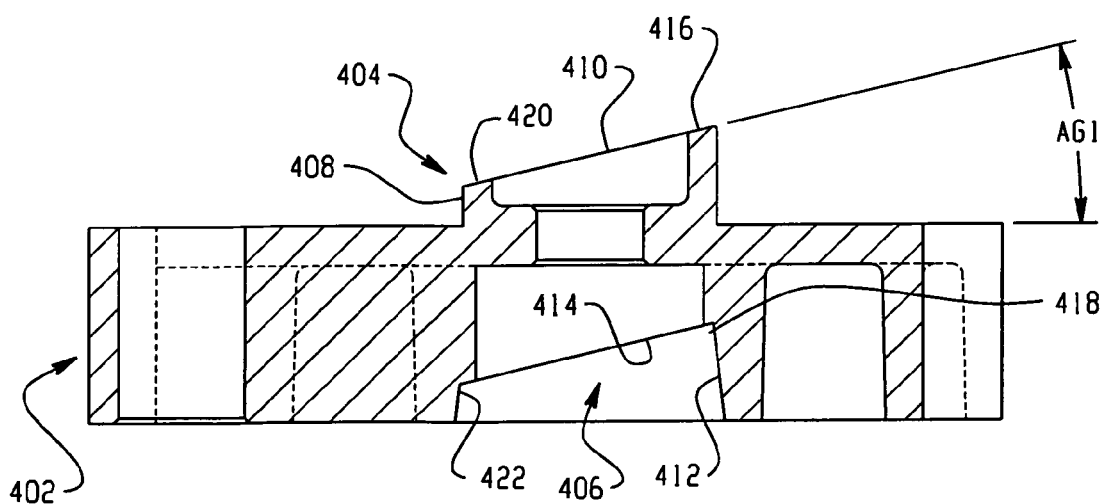
FIG. 13 is a cross-sectional side view of the spacer in FIG. 12 taken along line 13-13.

Another embodiment of a spacer 400 in accordance with the present novel concept is shown in FIGS. 12 and 13 and includes a spacer body 402, a first indexing feature 404 and a corresponding second indexing feature 406. Spacer 400 is substantially similar to spacer 200 shown in FIGS. 4-9 and described above with regard thereto. However, spacer 400 differs from spacer 200 in that the conformation or pattern forming indexing features 404 and 406 includes only one occurrence of a geometric pattern rather than the two occurrences of the sine wave in spacer 200. First indexing feature 404 includes a first feature side wall 408 that extends from the spacer body and terminates at a first feature end wall 410. Second indexing feature 406 includes a second feature side wall 412 that extends into the spacer body to a second feature end wall 414. As mentioned above, rather than including two occurrences of a sine wave patter, the first feature end wall and second feature end wall include a single occurrence of a geometric pattern, which makes up the profile of the end walls. Since there is only one occurrence of the geometric pattern, the spacers will have only one corresponding indexing position. In indexing features 404 and 406, the end walls have been formed by slicing through the substantially cylindrical side walls at an angle AG1 relative to the substantially planar surface of the spacer body.

Figure 14:
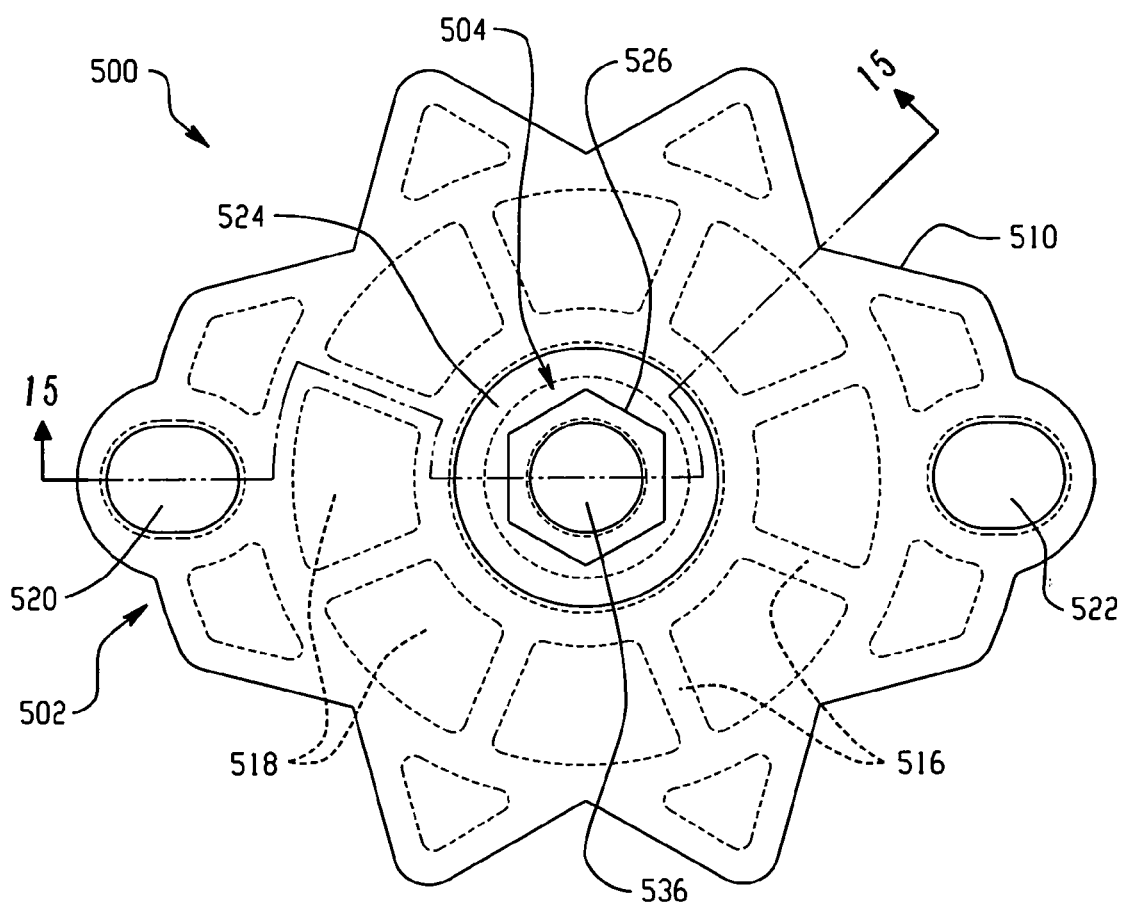
FIG. 14 is a top plan view of still another embodiment of a spacer in accordance with the present novel concept.
Figure 15:
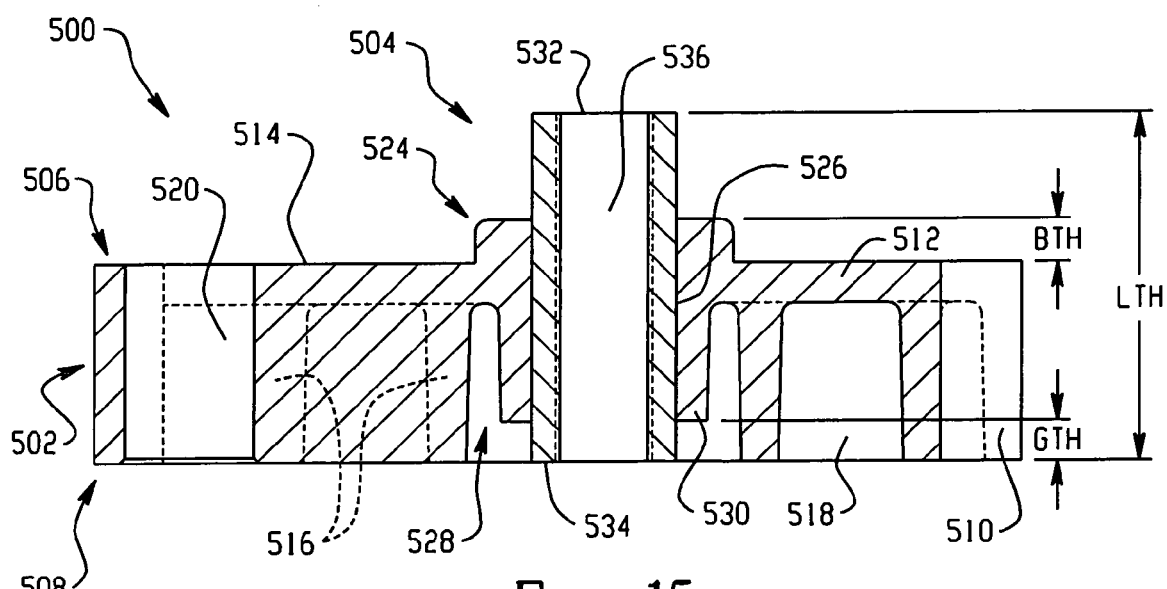
FIG. 15 is a cross-sectional side view of the spacer in FIG. 14 taken along line 15-15.

Still another embodiment of a spacer 500 in accordance with the present novel concept is shown in FIGS. 14 and 15 and includes a spacer body 502 and a spacer sleeve 504. Spacer body 502 includes a first or top side 506 and an opposing second or bottom side 508. An outer peripheral wall 510 extends between the top and bottom sides, and a top wall 512 extends along to side 506 and forms a solid top surface 514. A plurality of inner walls 516 extend from top wall 512 and form a corresponding plurality of cored areas or voids 518. A pair of spaced-apart slots or elongated holes 520 and 522 extend through spacer body 502 and are suitable for receiving fasteners or other components.

A boss 524 projects outwardly from top surface 514, as indicated by dimension BTH, and a body passage 526 extends through the boss and top wall into a recess 528 that is formed into spacer body 502 from along the bottom side. A support wall 530 extends from top wall 512 into recess 528 and stops short of the bottom wall forming a gap therebetween, as indicated by dimension GTH. Preferably, dimension GTH is at least slightly greater than the dimension BTH of boss 524 so that the boss of one spacer can be fully received into the recess of another spacer.

Spacer sleeve 504 has an outer peripheral shape of a hexagon, though it will be appreciated that any other suitable shape could be used. Spacer sleeve 504 extends between opposing ends 532 and 534 generally defining the overall length of the spacer sleeve, as indicated by dimension LTH. Preferably, passage 526 will have a cross-section suitable for receiving the spacer sleeve, and is shown in FIGS. 14 and 15 as having a corresponding hexagonal shape. However, it will be appreciated that any other shape can be used that is suitable for resisting rotation and/or maintaining alignment of the spacer sleeve relative to the spacer body. Additionally, a passage 536 extends lengthwise through the spacer sleeve. Passage 536 is shown as a threaded hole. However, a clearance hole can also be used.

Preferably, the spacer sleeve will have sufficient length LTH to be received at least partially into a first spacer and at least one of a corresponding second spacer and a compatible passage in an end member of an air spring. Thus, the first spacer and other components can be aligned and maintained in alignment, as desired. It will be appreciated that by changing the length and/or quantity of the spacer sleeve or sleeves, any suitable number of spacers can be used. Additionally, it will be appreciated that the present embodiment may not include the self-aligning feature discussed above with regard to other constructions.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. An air spring spacer for use in mounting an associated air spring in spaced relation to an associated vehicle component of an associated vehicle with one of the associated air spring and the associated vehicle component including an associated external structural feature, said air spring spacer comprising:
a spacer body having a first side, an opposing second side, a central axis extending between said first and second sides and a body structural feature for alignment with the associated external structural feature;

a first indexing feature disposed on said spacer body toward said first side thereof and capable of rotating said spacer body about said axis such that said body structural feature can be approximately rotatably aligned with the associated external structural feature upon engagement of said first indexing feature with an associated external indexing feature, said first indexing feature having a first indexing conformation establishing a first predetermined rotational orientation of said first indexing feature about said axis relative to said body structural feature; and, a second indexing feature complementary to said first indexing feature, said second indexing feature being disposed on said spacer body toward said second side thereof, and said second indexing feature including a second indexing conformation establishing a second predetermined rotational orientation of said second indexing feature about said axis relative to said body structural feature that is substantially similar to said first predetermined rotational orientation of said first indexing feature.

2. An air spring spacer according to claim 1, wherein each of said first and second indexing features include at least two occurrences of a geometric indexing pattern formed along a portion thereof and capable of positioning said body structural feature in one of only two predetermined rotational orientations relative to the associated external structural feature.

3. An air spring spacer according to claim 1, wherein said first indexing feature includes a projection extending from said spacer body, and said projection includes an outer end wail, an outer side wall and at least a portion of said first indexing conformation.

4. An air spring spacer according to claim 3, wherein said second indexing feature includes a recess extending into said spacer body, and said recess includes an inner end wall, an inner side wall and at least a portion of said second indexing conformation.

5. An air spring spacer according to claim 1, wherein said first indexing feature includes a recess extending into said spacer body, and said recess includes an inner end wall, an inner side wall and at least a portion of said first indexing conformation.

6. An air spring spacer according to claim 3, wherein said projection is integrally formed on said spacer body.

7. An air spring spacer according to claim 1, wherein said second indexing conformation is substantially identical to said first indexing conformation.

8. An air spring spacer for use in mounting an associated air spring in spaced relation to an associated vehicle component of an associated vehicle with one of the associated air spring and the associated vehicle component including an associated external structural feature, said air spring spacer comprising:

a spacer body having a first side, an opposing second side and a body structural feature;

a first indexing feature disposed on said spacer body toward said first side thereof and having a first predetermined orientation relative to said body structural feature; and, a second indexing feature complementary to said first indexing feature, said second indexing feature being disposed on said spacer body toward said second side thereof and in a second predetermined orientation relative to said body structural feature that is substantially similar to said first predetermined orientation of said first indexing feature;

one of said first and second indexing features including a recess extending into said spacer body and the other of said first and second indexing features including a projection extending from said spacer body generally opposite said recess, said recess being at least partially formed from a recess wall having a first indexing conformation and said projection being at least partially formed from a projection wail having a second indexing conformation complementary to said first indexing conformation with at least one of said first and second indexing conformations including a plurality of repetitions of a geometric pattern.

9. An air spring spacer according to claim 8, wherein said geometric pattern includes a sinusoidal wave.

10. An air spring assembly adapted for use on an associated vehicle component of an associated vehicle, said air spring assembly comprising:

an air spring including a longitudinally-extending central axis, a first end member having a spring structural feature disposed in a first rotational orientation about said axis, a second end member in spaced relation to said first end member and a flexible wall secured between said first and second end members; and, a spacer suitable for supporting said air spring in spaced relation to the associated vehicle component, said spacer including a first side, an opposing second side, a central axis extending between said first and second sides, a spacer structural feature and a first indexing feature;

said first indexing feature being disposed on said spacer toward said first side and in a first predetermined rotational orientation about said axis relative to said spacer structural feature, and said first indexing feature including a first indexing conformation such that upon engagement of said first indexing feature with an associated external indexing feature said spacer is caused to rotate about said central axis such that said spacer structural feature is displaced into an aligned orientation with an associated external structural feature.

11. An air spring assembly according to claim 10, wherein said spring structural feature includes one of a mounting stud and a recess for receiving a fastener, and said spacer structural feature includes an opening suitable for receiving said one of said mounting stud and said fastener.

12. An air spring assembly according to claim 10, wherein said spring structural feature includes a spring structural wall and said spacer structural feature includes a spacer structural wall.

13. An air spring assembly according to claim 10, wherein said spacer includes a second indexing feature complimentary to said first indexing feature, and said second indexing feature is disposed on said spacer toward said second side in a second predetermined rotational orientation relative to said spacer structural feature, said first and second predetermined rotational orientations being substantially similar such that said first and second indexing features are in substantial alignment with one another.

14. An air spring assembly according to claim 13, wherein said spacer is a first spacer and said air spring assembly includes a second spacer substantially identical to said first spacer, said second spacer including a first side, a second side spaced from said first side, a spacer structural feature, a first indexing feature and a second indexing feature complementary to said first indexing feature.

15. An air spring assembly according to claim 14, wherein said first side of said first spacer is in abutting engagement with said first end member, and said first side of said second spacer is in abutting engagement with said second side of said first spacer.

16. An air spring assembly according to claim 14, wherein said first indexing feature of each of said first and second spacers includes a projection extending from said first side thereof, with each of said projections including at least a portion of said first indexing conformation formed thereon.

17. An air spring assembly according to claim 16, wherein said second indexing feature of each of said first and second spacers includes a recess extending into said second side thereof with each of said recesses including at least a portion of said second indexing conformation formed thereon, which second indexing conformation is substantially complementary to said first indexing conformation.

18. An air spring assembly according to claim 10, wherein said first end member of said air spring includes a spring indexing feature disposed in a first rotational orientation about said longitudinally-extending central axis, said spring indexing feature adapted to engage said first indexing feature of said spacer and thereby rotationally register said spacer about said central axis thereof relative to said first end member and thereby substantially align said spring structural feature and said spacer structural feature.

19. An air spring mounting kit for use in mounting an air spring on an associated suspension component of an associated vehicle and in selectively spaced relation thereto, said air spring mounting kit comprising:
a first spacer including a first side, an opposing second side, a central axis extending between said first and second sides, a spacer structural feature, a first indexing feature formed toward said first side and a second indexing feature formed toward said second side, said first and second indexing features being complementary to one another and disposed in a predetermined rotational orientation relative to said spacer structural feature, said first indexing feature including a first indexing conformation, and said second indexing feature including a second indexing conformation; and,
a second spacer including a first side, an opposing second side, a central axis extending between said first and second sides, a spacer structural feature, a first indexing feature formed toward said first side and a second indexing feature formed toward said second side, said first and second indexing features being complementary to one another and disposed in a predetermined rotational orientation relative to said spacer structural feature, said first indexing feature including a first indexing conformation, and said second indexing feature including a second indexing conformation;
said first indexing feature of said first spacer and second indexing feature of said second spacer being adapted to coaxially interengage one another such that said first and second indexing conformations respectively thereof contact one another and upon undergoing an axially applied external force therebetween said first and second spacers are caused to automatically rotationally register said spacer structural feature of said first spacer and said spacer structural feature of said second spacer in substantial alignment with one another.

20. An air spring mounting kit according to claim 19, wherein said first indexing feature of each of said first and second spacers includes one of a recess and a projection and at least a portion of said first indexing conformation is formed along said one of said recess and said projection.

21. An air spring mounting kit according to claim 20, wherein said second indexing feature of each of said first and second spacers includes the other of said recess and said projection and at least a portion of said second indexing conformation is formed along the other of said recess and said projection, said second indexing conformation being substantially identical to said first indexing conformation.

22. An air spring and spacer combination adapted for use on an associated vehicle component of an associated vehicle, said air spring and spacer combination comprising:
an air spring including a longitudinally-extending central axis, a first end member, a second end member in spaced relation to said first end member and a flexible wall secured between said first and second end members and at least partially defining a spring chamber therebetween, said first end member including a spring structural feature disposed in a first rotational orientation about said axis and a spring indexing feature disposed in a first predetermined rotational orientation about said axis relative to said spring structural feature; and,
a spacer suitable for supporting said air spring in spaced relation to the associated vehicle component, said spacer including a first side, an opposing second side, a central axis extending between said first and second sides, a spacer structural feature and a first indexing feature disposed on said spacer in a second predetermined rotational orientation about said axis relative to said spacer structural feature;
said spring indexing feature and said spacer indexing feature being cooperative with one another such that upon axially displacing said first end member and said spacer toward one another said spring indexing feature and said spacer indexing feature automatically cause relative rotation between said first end member and said spacer and thereby approximately rotationally align said spring structural feature with said spacer structural feature.

23. An air spring and spacer combination according to claim 22, wherein at least one of said spring indexing feature or said spacer indexing feature includes a substantially continuous end wall extending approximately transverse to said axis.

24. An air spring and spacer combination according to claim 22, wherein at least one of said spring indexing feature or said spacer indexing feature includes at least one axially extending rib.

25. An air spring and spacer combination according to claim 24, wherein said at least one axially extending rib includes a plurality of axially extending ribs each having an end wall portion.

26. An air spring and spacer combination according to claim 25, wherein said end portions of said plurality of axially extending ribs are disposed in an approximately sinusoidal wave pattern.

27. An air spring and spacer combination according to claim 22, wherein said spring indexing feature and said spacer indexing feature are respectively integrally formed on said first end member and said spacer.

28. An air spring and spacer combination according to claim 27, wherein said spring indexing feature includes one of a projection and a recess and said spacer indexing feature includes the other of a projection and a recess such that said projection and said recess are adapted to cooperatively interengage one another.

29. An air spring and spacer combination according to claim 27, wherein said spring indexing feature and said spacer indexing feature each include a recess formed respectively into said first end member and said spacer, and said air spring and spacer combination further comprises a spacer sleeve adapted to cooperatively engage said recesses.

30. An air spring and spacer combination according to claim 29, wherein said recess of said spring indexing feature includes a spring indexing conformation and said recess of said spacer indexing feature includes a spacer indexing conformation, and said spacer sleeve includes opposing end walls each having an indexing conformation complimentary to at least one of said spring indexing conformation or said spacer indexing conformation.

* * * * *

UNITED STATES PATENT AND TRADEMARK OFFICE
CERTIFICATE OF CORRECTION

PATENT NO. : 7,328,887 B2  
APPLICATION NO. : 11/096752  
DATED : February 12, 2008  
INVENTOR(S) : Joshua R. Leonard It is certified that error appears in the above-identified patent and that said Letters Patent is hereby corrected as shown below:

Column 11, line 32, delete claim 3 and insert the following:

3. An air spring spacer according to claim 1, wherein said first indexing feature includes a projection extending from said spacer body, and said projection includes an outer end wall, an outer side wall and at least a portion of said first indexing conformation.

Signed and Sealed this

Tenth Day of June, 2008

JON W. DUDAS  
*Director of the United States Patent and Trademark Office*